(12) United States Patent
Küpper

(10) Patent No.: US 10,300,449 B2
(45) Date of Patent: May 28, 2019

(54) NEUTRALIZATION PLANT

(71) Applicant: Bayer Aktiengesellschaft, Leverkusen (DE)

(72) Inventor: Achim Küpper, Leverkusen (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 0 days.

(21) Appl. No.: 15/764,149

(22) PCT Filed: Sep. 26, 2016

(86) PCT No.: PCT/EP2016/072797
§ 371 (c)(1),
(2) Date: Mar. 28, 2018

(87) PCT Pub. No.: WO2017/055197
PCT Pub. Date: Apr. 6, 2017

(65) Prior Publication Data
US 2018/0257056 A1    Sep. 13, 2018

(30) Foreign Application Priority Data
Sep. 30, 2015   (EP) ...................................... 15187610

(51) Int. Cl.
*B01J 19/00*       (2006.01)
*G05D 21/02*       (2006.01)

(52) U.S. Cl.
CPC .......... *B01J 19/0006* (2013.01); *G05D 21/02* (2013.01); *B01J 2219/002* (2013.01);
(Continued)

(58) Field of Classification Search
CPC .......... B01J 19/0006; B01J 2219/00177; B01J 2219/002; B01J 2219/00209;
(Continued)

(56) References Cited

U.S. PATENT DOCUMENTS 3,459,499 A * 8/1969 Mullen, Jr. ............. C01B 25/28
422/618

FOREIGN PATENT DOCUMENTS

DE   4403682 A1   8/1995
DE   20306503 U1  7/2003
WO   0202465 A1   1/2002

OTHER PUBLICATIONS

PCT International Search Report for PCT/EP2016/072797, dated Jan. 13, 2017.

* cited by examiner

*Primary Examiner* — Lessanework Seifu
(74) *Attorney, Agent, or Firm* — McBee Moore Woodward & Vanik IP, LLC

(57) ABSTRACT

The invention relates to a neutralization plant (100) comprising at least one reaction chamber (102) having a first feed (114) for an acid-containing product and at least one further feed (116) for a base-containing product, wherein at least one of the feeds (114, 116) comprises at least one valve means (118, 120) for controlling the inflow amount into the reaction chamber (102), wherein the ion controller apparatus (104, 204, 205) comprises at least one evaluation device (106, 206) set up for determining at least one actual ion concentration based on an actual pH of the mixture (122) present in the reaction chamber (102) and wherein the ion controller apparatus (104, 204) comprises at least one ion controller device (108, 208) comprising at least one ion controller (110, 210.1, 210.2, 211) set up for controlling the valve means (118, 120) according to the actual ion concentration and a target ion concentration.

15 Claims, 5 Drawing Sheets

(52) U.S. Cl.
CPC .............. *B01J 2219/0022* (2013.01); *B01J 2219/00177* (2013.01); *B01J 2219/00209* (2013.01); *B01J 2219/00213* (2013.01); *B01J 2219/00216* (2013.01); *B01J 2219/00231* (2013.01)

(58) Field of Classification Search
CPC .... B01J 2219/00213; B01J 2219/00216; B01J 2219/0022; B01J 2219/00231; G05D 21/02; G05D 21/00
See application file for complete search history.

NEUTRALIZATION PLANT

CROSS-REFERENCE TO RELATED APPLICATIONS

This application is a National Stage entry of International Application No. PCT/EP2016/072797, filed Sep. 26, 2016, which claims priority to European Patent Application No. 15187610.9, filed Sep. 30, 2015.

BACKGROUND

Field

The invention relates to a neutralization plant comprising at least one reaction chamber having a first feed for an acid-containing product and at least one further feed for a base-containing product, wherein at least one of the feeds comprises at least one valve means for controlling the inflow amount into the reaction chamber and at least one ion controller apparatus set up for controlling the valve means. The invention further relates to a method for neutralizing an acid-containing or base-containing product and to an ion controller apparatus.

Description Of Related Art

Chemical plants producing an acid-containing product or a base-containing product as principal products and/or byproducts are found in industry. For example a plant set up for producing 2,4-toluene diisocyanate (TDI) can produce hydrochloric acid as a byproduct. The hydrochloric acid may initially be intermediately stored in suitable storage containers to subsequently be transported further and/or made available to other chemical plants.

Disruptions can have the effect that the storage capacity limits for the hydrochloric acid are reached and no further hydrochloric acid can be stored. In the prior art it is customary to shut down the chemical plant in such a case. Particularly in the case where the produced acid or base is merely a byproduct shutdown of the chemical plant is accompanied by significant economic disadvantages for the operator because the principal product can no longer be produced.

In addition it is generally known from the prior art to neutralize an acid-containing product with a base-containing product (or vice versa) in a neutralization plant. A neutralization plant from the prior art may contain a reaction chamber. The reaction chamber may comprise a first feed, for example for an acid-containing product, and a further feed, for example for a base-containing product. At least one of the feeds may comprise a valve means to control the flow of the corresponding product into the reactor chamber.

For example in the above-described TDI plant the neutralization plant may comprise a first feed for the byproduct of the TDI plant, in the present case hydrochloric acid, and a further feed for the base-containing product, for example sodium hydroxide solution. In this example the further feed in particular comprises a valve means to control, for example to increase or to reduce, the inflow of the sodium hydroxide solution, i.e. the manipulated variable. This is typically effected depending on the measured actual pH of the mixture in the reaction chamber.

However, one problem herewith is that a controller apparatus having a pH controller set up for controlling the valve means must be operated nonlinearly. The reason for this is that the manipulated variable, such as the inflow of aqueous sodium hydroxide, influences the controlled variable, i.e. the pH to be controlled, nonlinearly on account of dissociation of water, the equilibrium of acid and conjugate base/of base and conjugate acid and logarithmic detection of the $H_3O^+$ concentration. In the relevant pH range an orders of magnitude change in the influence of the manipulated variable on the pH takes place. The control process therefore requires complex adjustment of the controller parameters via gain scheduling (variation of controller gain depending on measured pH).

Particularly for large deviations from the target pH (for example by >pH 2) it is additionally necessary for the controller to undertake aggressive alteration of the manipulated variable. This is difficult to implement particularly for a pH controller.

The problem addressed by the present invention is accordingly that of providing a neutralization plant which allows improved control of a neutralization process in simple fashion.

SUMMARY

The problem derived and set out above is solved according to a first aspect of the invention by a neutralization plant according to claim 1. The neutralization plant comprises at least one reaction chamber having a first feed for an acid-containing product and at least one further feed for a base-containing product. At least one of the feeds comprises at least one valve means for controlling the inflow amount into the reaction chamber. The ion controller apparatus comprises at least one evaluation device set up for determining at least one actual ion concentration based on an actual pH of the mixture present in the reaction chamber. The ion controller apparatus comprises at least one ion controller device comprising at least one ion controller set up for controlling the valve means depending on the actual ion concentration and a target ion concentration.

DETAILED DESCRIPTION OF A PREFERRED EMBODIMENT

Figure 1:
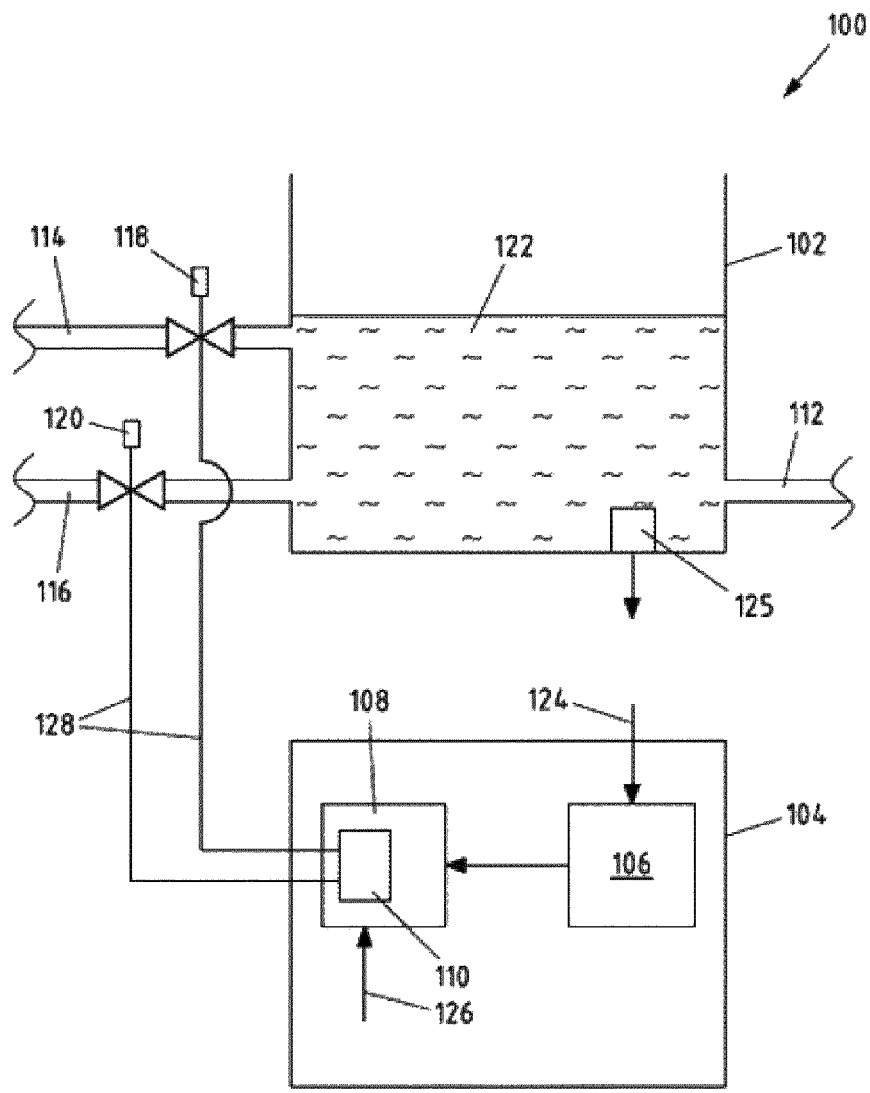
FIGS. 1-4 depict embodiments as described herein.

When, in contrast to the prior art, an actual ion concentration is determined from the especially measured actual pH and this is used as an (auxiliary) controlled variable of an ion controller an improved control of a neutralization process is achieved in simple fashion. In particular this can achieve a linearization of the control problem, i.e. a virtually linear behaviour of the at least one controller with respect to the system over at least a substantial part of the relevant pH range can be achieved. In this pH range an orders of magnitude change in the influence of the manipulated variable on the pH takes place. The solution according to the invention makes it possible to eschew complex adjustment of the controller parameters via gain scheduling (variation of controller gain depending on measured pH). It is achievable that for large deviations from a target pH (for example >pH 2) aggressive alteration of the manipulated variable is undertaken by the ion controller while for smaller deviations from the target pH (for example <pH 2) the alteration of the manipulated variable by the ion controller is orders of magnitude smaller and accordingly the pH of the process altogether converges rapidly to the desired target pH.

The neutralization plant comprises at least one reactor chamber. It is a feature of a reactor chamber that the chemical neutralization process proceeds in the reactor chamber. The liquid mixture of at least two liquid products, such as an acid-containing product and a base-containing product, may be located in the reactor chamber. A first product may be passed into the reactor chamber via a first feed, a pipeline for example, and a second product may be passed into the reactor chamber via a further feed, also a pipeline for example. It will be appreciated that the at least two feeds may be implemented in the form of a common feed. It will further be appreciated that the neutralization process may be a multistage process with a plurality of reactor chambers. The neutralization function of a reactor chamber may also be achieved by a tubular reactor or mixer.

At least one of the feeds comprises a valve means to control, i.e. for example to increase or to reduce, the inflow amount into the reactor chamber. In particular at least the feed comprises at least one valve means through which a product/product stream which serves as a manipulated variable of the control system is conveyed. If for example an acid-containing product is to be neutralized, at least the feed of the product serving as the manipulated variable, such as the base-containing product, comprises a valve means. The valve means may be integrated into an underlying mass flow control system or a volume flow control system.

The at least one valve means comprises a communication link to an ion controller apparatus. The ion controller apparatus is set up to control the valve means, i.e. for example to bring about that the actuator of a valve is adjusted according to the manipulated variable determined by the ion controller apparatus. The flow amount through the feed can thus be increased (to a maximum value) or reduced (to a minimum value, for example 0).

The ion controller apparatus has the feature that an evaluation device is provided which is set up for deriving an ion concentration from a provided actual pH. It has been found that there is a fixed relationship between a pH and an ion concentration. The control problem can be linearized when from a provided actual pH of the mixture in the reactor chamber an actual ion concentration is determined, in particular calculated. A target ion concentration can be determined in corresponding fashion.

The ion controller apparatus comprises at least one ion controller device which comprises at least one ion controller. An ion controller is a controller which obtains and processes ion concentration values as inputs. In particular the ion controller controls the inflow of at least one product/product stream depending on the actual ion concentration of the mixture in the reactor chamber and a target ion concentration. The manipulated variable may be determined from the control deviation from the actual ion concentration to the target ion concentration. As previously described the manipulated variable may be transferred to the valve means via a communication link. The manipulated means, such as an actuator, of the valve means is then adjusted according to the manipulated variable.

The target ion concentration may be specified directly for the neutralization process. Alternatively a target pH may be specified which can be converted into a target ion concentration by the ion controller apparatus for example. The target ion concentration corresponds to a desired target pH. The target ion concentration/the target pH may be a regulatory specification for a mixture to be allowed to introduce this mixture into the environment, such as a river, for example. In the abovementioned example of a TDI plant the target pH specified may be a target pH of 7.8±0.3 for example. It will be appreciated that a target pH may have other values.

It will be appreciated that the ion controller apparatus may be at least partly implemented in a data processing device, such as a computer, etc.

In a first exemplary embodiment of the neutralization plant of the present invention the evaluation device may comprise a first evaluation module set up for determining a first actual ion concentration based on the actual pH. The evaluation device may comprise at least one further evaluation module set up for determining at least one further actual ion concentration based on the actual pH. By determining two different actual ion concentrations the broad actual pH range (for example pH 0 to pH 14) can be divided into two actual ion concentration ranges. It is then possible always to use the actual ion concentration that is best for the current control situation. In a particularly preferred exemplary embodiment the first actual ion concentration may be an actual $OH^-$ (hydroxide ion) ion concentration and/or the further actual ion concentration may be an actual $H3O^+$ (oxonium) ion concentration. Oxonium refers to a protonated water molecule ($H3O+$). Hydroxide ion is a negatively charged ion formed when bases react with water. While through addition of acids the equilibrium concentration through transfer of the protons from the acid to water molecules reduces the pH, in alkaline solutions the pH is increased since the concentration of oxonium ions is reduced.

A neutralization process can generally be controlled with a single ion controller. To achieve a particularly exact and prompt convergence of the actual pH to a target pH in a further embodiment the ion controller device may comprise a first ion controller and at least one further ion controller. The first ion controller may be set up to control the valve means according to the first actual ion concentration and the first target ion concentration. The further ion controller may be set up to control the valve means according to the further actual ion concentration and the further target ion concentration.

In a preferred embodiment the first ion controller may be an $OH^-$ ion controller. As an input parameter the $OH^-$ ion controller may obtain in particular an actual $OH^-$ ion concentration. The $OH^-$ ion controller may further obtain a target $OH^-$ ion concentration and determine the control deviation. In addition or alternatively the further ion controller may be an $H3O^+$ ion controller. As an input parameter the $H3O^+$ ion controller may obtain in particular an actual $H3O^+$ ion concentration. The $H3O^+$ ion controller may further obtain a target $H3O^+$ ion concentration and determine the control deviation. The effective direction of the $OH^-$ ion controller is in particular the reverse of the effective direction of the $H3O^+$ ion controller. In the case where the manipulated variable is a base stream the effective direction of the $OH^-$ ion controller is inverse and the effective direction of the $H3O^+$ ion controller is direct. In the case where the manipulated variable is an acid stream the effective direction of the $OH^-$ ion controller is direct and the effective direction of the $H3O^+$ ion controller is inverse.

It is preferable when in an ion controller device having two ion controllers the ion controllers are configured as competing ion controllers. In other words it is preferable when one of the two ion controllers is active while the other ion controller is inactive. Thus only one of the two is ever active. Only the manipulated variable of the active ion controller is transferred to the valve means. In order to choose a suitable active ion controller from the at least two ion controllers in one embodiment according to the invention the ion controller apparatus may comprise at least one ion controller selection device set up for determining an active ion controller from the first ion controller and the further ion controller, wherein only the active ion controller controls the valve means.

Because out of two ion controllers only one is ever active it is possible to select the ion controller which is best for the current circumstances/the present requirements of the control process. This allows the control process to be yet further improved. In particular the ion controller selection device may be set up to determine the active ion controller based on the control deviation between the first actual ion concentration and the first target ion concentration and/or the control deviation between the further actual ion concentration and the further target ion concentration. It has been found that the control deviation(s) in particular is a good criterion for selecting the currently preferred ion controller.

In a particularly preferred embodiment the ion controller selection device may comprise a first controlled variable deviation module set up for determining the magnitude of the control deviation between the first actual ion concentration and the first target ion concentration. The ion controller selection device may comprise at least one further controlled variable deviation module set up for determining the magnitude of the control deviation between the further actual ion concentration and the further target ion concentration. The ion controller selection device may comprise at least one comparison module set up to compare the determined magnitudes, i.e. the magnitude of the control deviation between the first actual ion concentration and the first target ion concentration and the magnitude of the control deviation between the further actual ion concentration and the further target ion concentration. The ion controller selection device may be set up to determine the active ion controller based on the comparison result. It has been found in particular that it is advantageous when the ion controller having the larger control deviation in terms of magnitude is determined as the active ion controller.

It is preferable when the ion controller selection device checks which ion controller of the at least two ion controllers should be rendered active and which should be rendered inactive at particular time intervals or virtually continuously for example. In order always to render the preferred ion controller active and the other inactive without causing a jump in the controlled variable it is preferable when the inactive ion controller is tracked. In one embodiment of the neutralization plant the ion controller selection device may be set up to switch the inactive ion controller to tracking such that a substantially smooth switchover between the first ion controller and the further ion controller is achieved. A smooth switchover is in particular to be understood as meaning that the manipulated variable is constant at the moment of switchover.

In an alternative embodiment the at least two ion controllers may be combined in a single ion controller. A combined ion controller may preferably be provided. The combined ion controller may be set up to control the valve means according to an actual combined ion concentration and a target combined ion concentration. A first determination module set up for determining the actual combined ion concentration according to the actual $OH^-$ ion concentration and the actual $H3O^+$ ion concentration may be provided. A further determination module set up for determining the target combined ion concentration according to the target $OH^-$ ion concentration and the target $H3O^+$ ion concentration may be provided. In particular, an $OH^-$ ion controller and an $H3O^+$ ion controller may be combined to afford one controller. The $OH^-$ ion concentration and the $H3O^+$ ion concentration may be combined to afford one combined ion concentration for example. Since the $OH^-$ ion concentration range requires a reversed controller effective direction to the $H3O^+$ ion concentration range the effective direction of the combined controller may be (indirectly) reversed for the $OH^-$ ion concentration range via a negative prefix. The combined ion concentration may be the $H3O^+$ ion concentration when the $H3O^+$ ion concentration is greater than the $OH^-$ ion concentration. The combined controller may for example operate directly in the case of a base stream as the manipulated variable or inversely with an acid stream as the manipulated variable. When the $H3O^+$ ion concentration is smaller than the $OH^-$ ion concentration the combined ion concentration may be the $OH^-$ ion concentration. As described above this may be effected with a negative prefix. The effective direction of the controller for the $OH^-$ ion concentration range may be indirectly switched from direct to inverse (or from inverse to direct) via the negative prefix. The combined ion concentration is calculated both for the target pH and for the actual pH and supplied to the remaining controller as a target combined ion concentration/actual combined ion concentration.

For the embodiment having one controller it must be ensured that preferably a correction of the pH is established such that the transition between the $OH^-$ ion concentration and the $H3O^+$ ion concentration (one concentration becomes greater than the other) is effected at the breakthrough of the titration curve. This is necessary in particular to achieve the same system response (behaviour of the ion concentration upon alteration of the manipulated variable) over both ion concentration ranges. Accordingly, a satisfactory behaviour of the closed control loop can be established with the one controller for both ion concentration ranges (i.e. a good control response (actual value follows target value) and disturbance variable suppression).

Various controllers may in principle be employed as ion controllers. In a preferred embodiment the ion controller may be a PID controller (proportional-integral-derivative controller). In particular, all ion controllers may be PID controllers.

It has further been found that a provided, for example previously measured, actual pH may be erroneous on account of temperature influences, salt formation processes and similar influences. In one embodiment according to the invention it is therefore proposed that the ion controller apparatus comprises at least one correction device set up for correcting the actual pH of the mixture present in the reaction chamber. In particular, the actual pH may be corrected by the known influences (acid and base combination, temperature, salt formation) on dissociation of water. The corrected actual pH may then be provided/forwarded to the evaluation device for determining, in particular calculating, the at least one actual ion concentration based on this corrected actual pH. The correction of the temperature influence and the salt influence may in particular be effected such that the switchover of the ion controllers can take place (approximately) at the breakthrough point of the titration curve. The target pH may be corrected in corresponding fashion. If switchover is effected at the breakthrough point of the titration curve the (linear) system response of the auxiliary controlled variables actual $OH^-$ ion concentration and actual $H3O^+$ ion concentration to changes in the manipulated variable may be identical with the exception of the prefix. With the exception of the effective direction (inverse, direct) both ion controllers may therefore be parameterized in the same way.

As described above in the variant having one controller a pH control system is required so that the transition from H3O+ to OH− is effected at the breakthrough point of the titration curve. This is necessary to achieve a satisfactory behaviour of the closed control loop over the entire pH range with one parameter set of the PID controller.

Furthermore, at least one measuring device set up for measuring the actual pH of the mixture present in the reaction chamber may be provided. The measuring device may comprise a pH meter for example. The measuring device may further have a communication link with the ion controller apparatus. Measurement of the actual pH may preferably be performed (virtually) continuously.

A further aspect of the invention is a method for neutralizing an acid-containing product or base-containing product. The method comprises:

providing an actual pH of a mixture present in a reaction chamber, determining at least one actual ion concentration from the actual pH and controlling the inflow into the reaction chamber of at least one product according to the determined actual ion concentration and a target ion concentration.

The method may be performed in a neutralization plant, in particular the above-described neutralization plant. The method may in particular be a computer-implemented method.

An acid-containing product stream and a base-containing product stream may inflow into a reactor chamber and form a mixture. The pH of the mixture may be measured and in particular provided. An evaluation device may determine at least one actual ion concentration from the provided, in particular measured, actual pH. The at least one actual ion concentration may preferably be calculated. Control of the inflow into the reaction chamber may in particular be effected automatically.

A still further aspect of the invention is an ion controller apparatus for a neutralization plant. The ion controller apparatus comprises at least one evaluation device set up for determining at least one actual ion concentration from an actual pH of a mixture present in a reaction chamber of the neutralization plant. The ion controller apparatus comprises at least one ion controller device having at least one ion controller set up for controlling at least one valve means of a feed into the reaction chamber of the neutralization plant according to the actual ion concentration and a target ion concentration.

The features of the methods, apparatuses and plants may be freely combined with one another. In particular, features of the description and/or of the dependent claims may be independently inventive on their own or when freely combined with one another, even while completely or partially circumventing features of the independent claims.

Figure 2A:
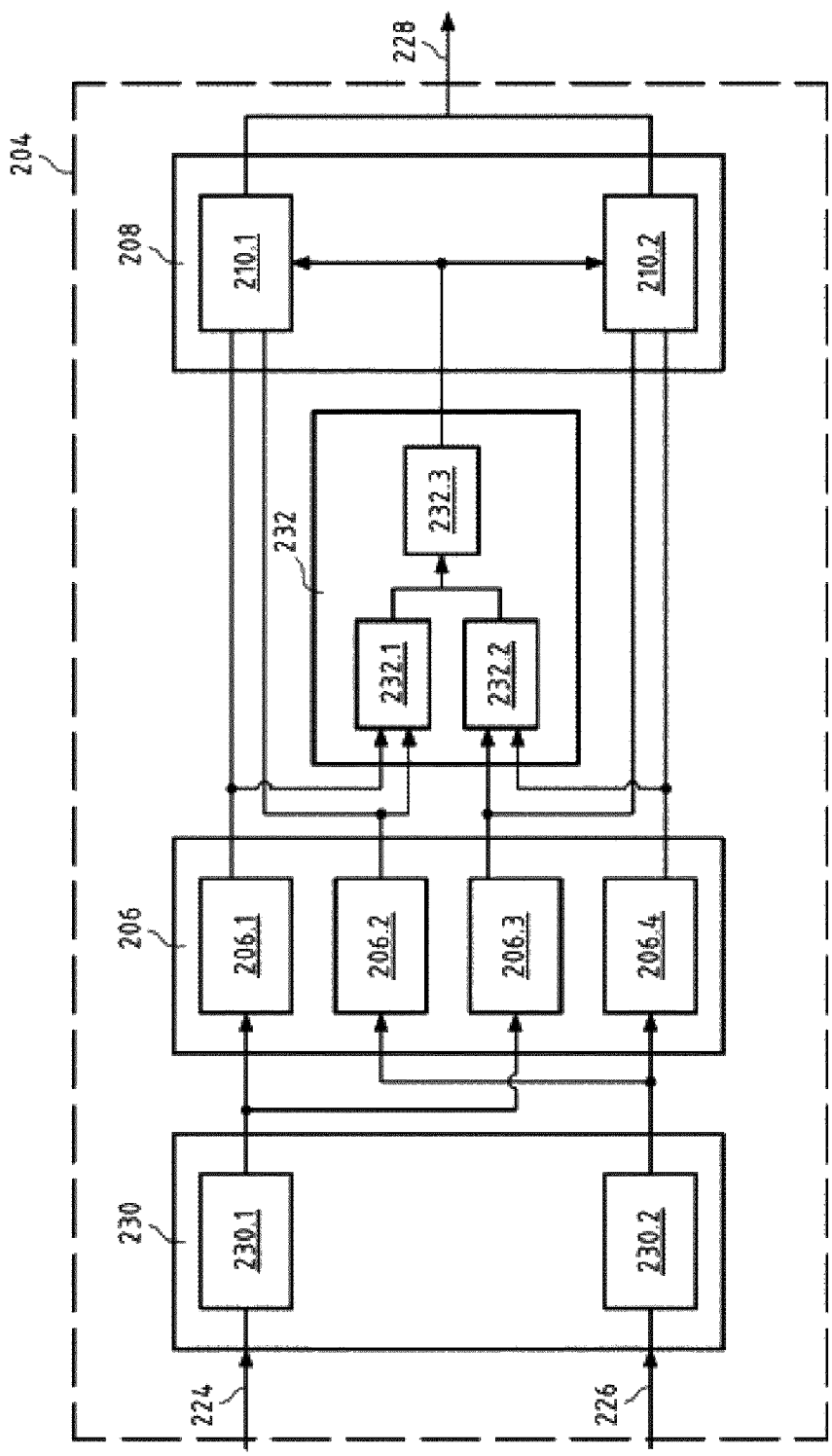
Figure 2B:
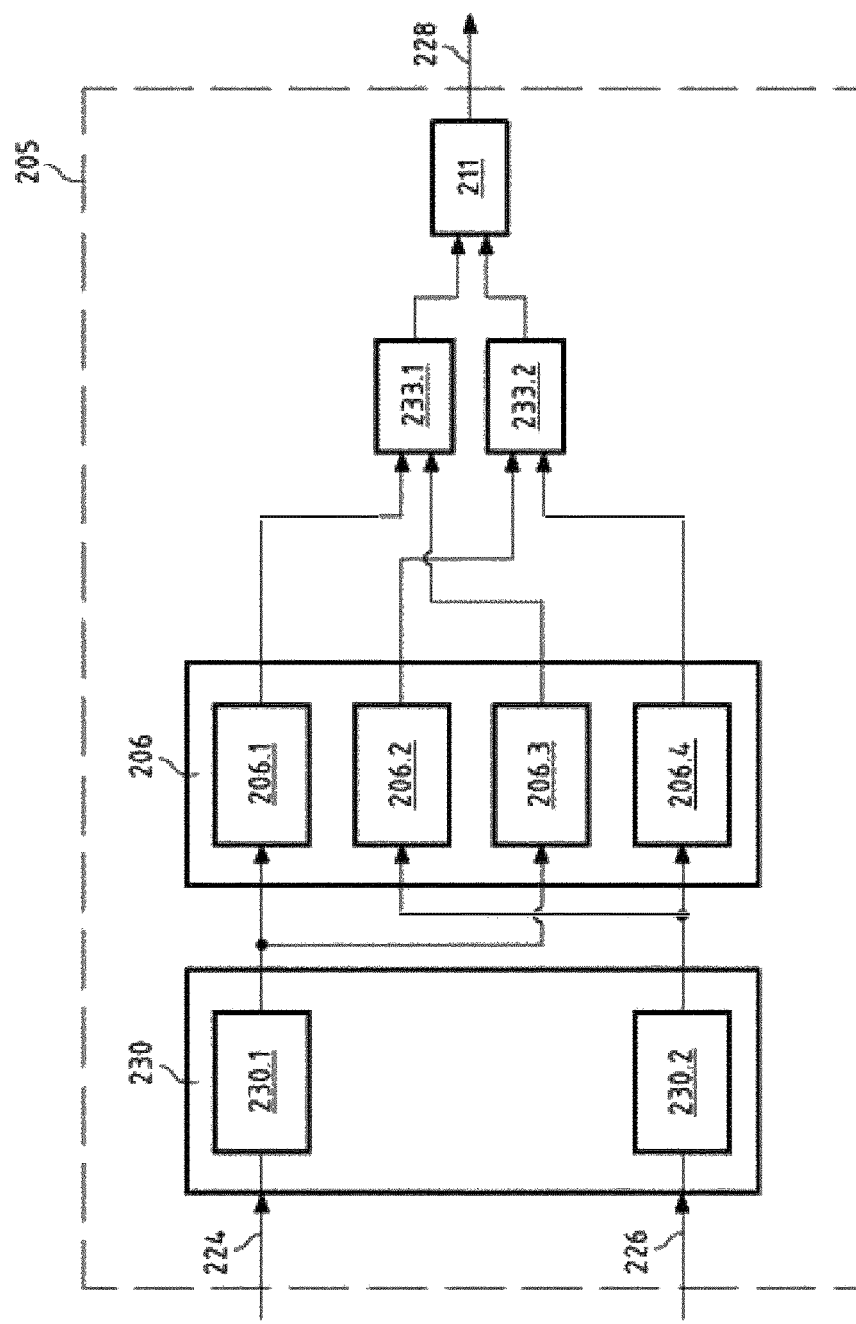
Figure 3A:
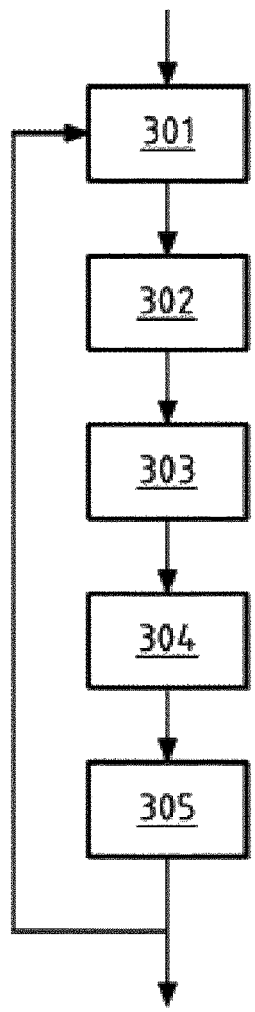
Figure 3B:
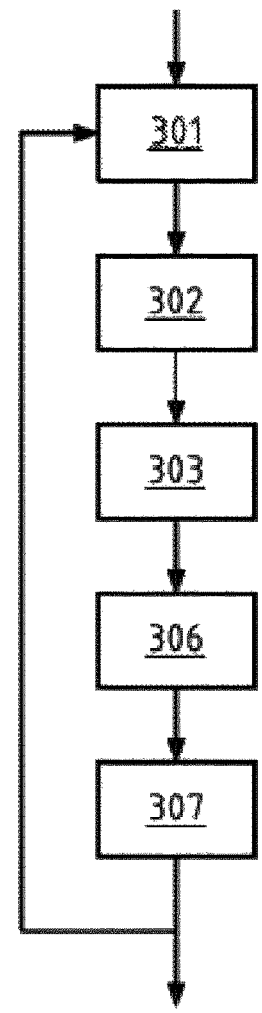
Figure 4:
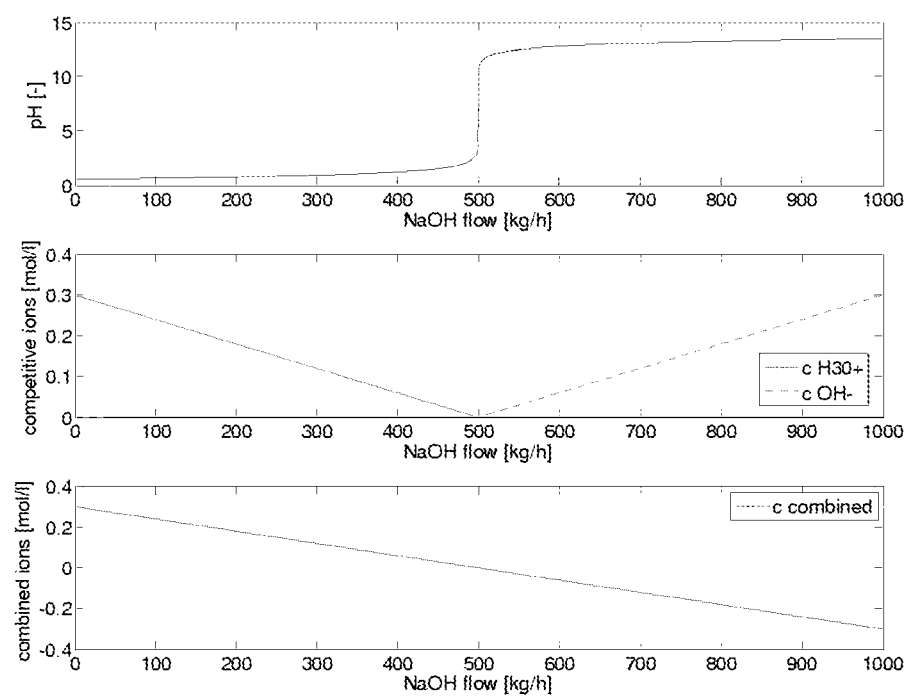

There are now a great many options for configuring and further developing the inventive neutralization plant, the inventive method and the inventive ion controller apparatus. In this respect, reference should be made on the one hand to the patent claims arranged subordinate to the independent patent claims, on the other hand to the description of exemplary embodiments in conjunction with the drawing. In the drawing:

FIG. 1 shows an exemplary embodiment of a neutralization plant according to the present invention, FIG. 2a shows an exemplary embodiment of an ion controller apparatus according to the present invention, FIG. 2b shows a further exemplary embodiment of an ion controller apparatus according to the present invention, FIG. 3a shows an exemplary embodiment of a method according to the present invention, FIG. 3b shows a further exemplary embodiment of a method according to the present invention and FIG. 4 shows a simulation example for neutralization of a hydrochloric acid stream HCl of 550 kg/h with a sodium hydroxide solution stream NaOH as the manipulated variable.

Hereinbelow, identical reference numerals are used for identical elements.

FIG. 1 shows a first exemplary embodiment of a neutralization plant 100 according to the present invention. The neutralization plant 100 comprises a reactor chamber 102 and a first exemplary embodiment of an ion controller apparatus 104 according to the present invention in the present case.

The reaction chamber 102 is set up such that a neutralization process may be performed therein. Via a first feed 114 an acid-containing product may be introduced into the reaction chamber 102, for example. Via a second feed 116 a base-containing product may be introduced into the reaction chamber 102. The inflow of the two products may—as will be explained hereinbelow—be controlled such that the products neutralize one another, i.e. the mixture 122 has a desired (neutral) pH. The mixture 122 may then be passed into the surroundings via an outlet 112. For example the mixture 122 may be introduced into a river, lake or the like without this causing damage to the environment.

The neutralization process will now be described by way of example for hydrochloric acid which is to be neutralized by addition of sodium hydroxide solution. In particular the mixture 122 in the reactor chamber comprising hydrochloric acid and sodium hydroxide solution is neutralized such that the mixture has a specifiable and desired pH, i.e. a target pH. In an exemplary plant the objective may be to feed the resulting mixture into the environment, for example a river. Here, the target pH may be for example between 7 and 8.5, for example 7.8±0.3.

The following example reaction may take place in the reactor chamber 102:

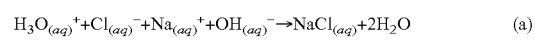

$$H_3O_{(aq)}^+ + Cl_{(aq)}^- + Na_{(aq)}^+ + OH_{(aq)}^- \rightarrow NaCl_{(aq)} + 2H_2O \qquad (a)$$

In other words hydrochloric acid and sodium hydroxide solution may react to afford sodium chloride dissolved in water, and water.

The reactor chamber 102 may further comprise at least one measuring device 125. The measuring device 125 is in particular set up for capturing the actual pH of the mixture 122. The measuring device 125 may comprise a pH meter for example.

Each of the at least two feeds 114, 116 of the present exemplary embodiment may comprise at least one valve means 118, 120. A valve means 118, 120 is set up for controlling the flow amount through a feed 114, 116. In other words the (respective) inflow amount into the reactor chamber 102 can be controlled via the valve means 118, 120. It will be appreciated that only the inflow of one of the at least two products can be controlled. When for example the problem addressed by the neutralization plant is that of neutralizing a byproduct of another process in order that this process need not be interrupted it is generally only the inflow of the manipulated variable, for example of the sodium hydroxide solution, that is controlled by the ion controller apparatus 104. In this case it is sufficient when merely the sodium hydroxide solution feed has a valve means which is controllable by the ion controller apparatus 104.

It will be appreciated that the reaction chamber is shown only schematically. The reaction chamber may comprise for example a plurality of chambers and/or at least one stirring means to achieve uniform mixing of the introduced substances/products.

The exemplary ion controller apparatus 104 according to the present invention comprises an evaluation device 106 and an ion controller device 108. The evaluation device 106 may in particular be or comprise a suitable data processing device comprising processor and storage means. The evaluation device 106 is in particular configured for determining at least one actual ion concentration from the actual pH provided and measured via a signal input 124.

The ion controller device 108 comprises at least one ion controller 110, such as a PID controller 110. Based on the at least one determined actual ion concentration and a target ion concentration provided via a signal input 126 the at least one ion controller 110 can control at least one valve means 118, 120 via a communication link 128. The target ion concentration corresponds in particular to the specifiable target pH.

FIG. 2a shows an exemplary embodiment of an ion controller apparatus 204 according to the present invention. The ion controller apparatus 204 comprises a correction device 230, an evaluation device 206, an ion controller selection device 232 and an ion controller device 208. Via a first signal input 224 the (current) actual pH of the mixture present in a reaction chamber may be provided to the (optional) correction device 230. Via a further signal input 226 the target pH may be provided to the correction device 230.

The correction device 230 may comprise data processing means, such as processor and storage means, set up for correcting the actual pH and/or the target pH. In particular a first correction module 230.1 may be provided for correcting the measured and provided actual pH by accounting for known influences (for example acid and base combination, temperature, salt formation) on dissociation of water. By way of example the corrected actual pH without the influence of salt formation may be calculated at a temperature of 25° C. The calculation may be performed as follows:

$$\text{pH\_corrected} = \text{pH} - \text{dpH}_{brine} - \text{dpH}(T), \quad (a2)$$

wherein for example $\text{dpH}_{brine}$ is a pH correction to correct the influence of brine on pH and $\text{dpH}(T)$ is a temperature-dependent pH correction to correct the influence of temperature.

The target pH may be converted in the same way in a further correction module 230.2.

It will be appreciated that structurally only one signal input or a multiplicity of signal inputs may also be provided. It will further be appreciated that the target pH may also be deposited and be retrievable in a storage device of the ion controller apparatus 204. It will likewise be appreciated that a correction device 230 may be eschewed when (previously) corrected pH values can be provided. For example a measuring device which already performs an automatic correction may be provided.

In the present exemplary embodiment the corrected actual pH and the corrected target pH (referred to hereinbelow as actual pH and target pH) are provided to the evaluation device 206. In the present preferred embodiment the evaluation device 206 comprises four evaluation modules 206.1 to 206.4.

The first evaluation module 206.1 obtains the actual pH as input. The first evaluation module 206.1 is set up for determining an actual OH⁻ ion concentration from the actual pH. The OH⁻ ion concentration may in particular be calculated according to the following calculation scheme:

$$\text{Actual OH}^- \text{ ion concentration} = 10^{(-14 + \text{actual pH})} \quad (b)$$

The target OH⁻ ion concentration may be calculated correspondingly in evaluation module 206.2:

$$\text{Target OH}^- \text{ ion concentration} = 10^{(-14 + \text{target pH})} \quad (c)$$

It will be appreciated that in other embodiments of the present invention the target OH⁻ ion concentration may be specified instead of a target pH and for example may be stored and may be retrievable in a storage means. In this case a calculation according to formula (c) may be eschewed.

The third evaluation module 206.3 obtains the actual pH as input. The third evaluation module 206.3 is set up for determining the actual H3O⁺ ion concentration from the actual pH. The H3O⁺ ion concentration may in particular be calculated according to the following calculation scheme:

$$\text{Actual H3O}^+ \text{ ion concentration} = 10^{(-\text{actual pH})} \quad (d)$$

The target H3O⁺ ion concentration may be calculated correspondingly in evaluation module 206.4:

$$\text{Target H3O}^+ \text{ ion concentration} = 10^{(-\text{target pH})} \quad (e)$$

In other words the pH values are antilogarithmized by the calculation schemes. It will be appreciated that in other embodiments of the present invention the target H3O⁺ ion concentration may be specified instead of a target pH and for example may be stored and may be retrievable in a storage means. In this case a calculation according to formula (e) may be eschewed.

As may further be derived from the exemplary embodiment of FIG. 2a the ion controller device 208 preferably comprises two ion controllers 210.1 and 210.2. The first ion controller 210.1, in particular an OH⁻ ion controller 210.1, obtains the target OH⁻ ion concentration and the actual OH⁻ ion concentration as inputs. The second ion controller 210.2, in particular an H3O⁺ ion controller 210.2, obtains the target H3O⁺ ion concentration and the actual H3O⁺ ion concentration as inputs. Both ion controllers 210.1 and 210.2 are set up for deriving a manipulated variable from the control deviation.

As described hereinbelow an ion controller selection device 232 can select which of the two ion controllers 210.1, 210.2 is actually used for controlling the at least one valve means. It has been found in particular that to achieve the exactest possible control and thus adaptation of the pH level of the mixture in the reactor chamber the controller having the larger controlled variable deviation in terms of magnitude is selected from the ion controllers. In other words only one of the ion controllers 210.1, 210.2 is ever active while the other is rendered inactive.

In particular, three modules 232.1 to 232.3 may be provided in the ion controller selection device 232 to this end. A first controlled variable deviation module 232.1 is set up for determining the control deviation for the OH⁻ ion concentration. A second controlled variable deviation module 232.2 is set up for determining the control deviation for the H3O⁺ ion concentration. This may be effected in particular based on the following calculation scheme:

$$\text{Control deviation} = \text{abs}(\text{target ion concentration} - \text{actual ion concentration}) \quad (f)$$

The calculated magnitudes (abs) of the respective control deviations may be provided by the controlled variable deviation modules 232.1, 232.2 to the third module 232.3, in particular a comparison module 232.3. The comparison module 232.3 is set up for comparing the provided magnitudes of the control deviation with one another. One of the ion controllers 210.1, 210.2 may then be activated according to the comparison result. In particular, the ion controller 210.1, 210.2 having the larger control deviation in terms of magnitude is activated.

The inactive ion controller 210.1, 210.2 may be set to tracking by the ion controller selection device 232. Here, tracking is to be understood as meaning in particular that the inactive ion controller 210.1, 210.2 tracks the manipulated variable of active ion controller 210.1, 210.2. During an activation a smooth switchover (manipulated variable is constant at moment of switchover) between the ion controllers 210.1, 210.2 can be achieved.

FIG. 2b shows a further exemplary embodiment of an ion controller apparatus 205 according to the present invention. The ion controller apparatus 205 differs from the above-described ion controller apparatus 204 in particular in terms of the blocks described by reference numerals 211 and 233.1, 233.2.

The actual $OH^-$ ion concentration may from evaluation module 206.1 and the actual $H3O^+$ ion concentration from evaluation module 206.3 be supplied to the first determination module 233.1 as inputs. The first determination module 233.1 is in particular set up for calculating the actual combined ion concentration according to the following calculation scheme:

When actual $H3O^+$ ion concentration >actual $OH^-$ ion concentration, actual combined ion concentration=actual $H3O^+$ ion concentration otherwise actual combined ion concentration=(−1)*actual $OH^-$ ion concentration.

The target $OH^-$ ion concentration from evaluation module 206.2 and the target $H3O^+$ ion concentration from evaluation module 206.4 may be supplied to the further determination module 233.2 as inputs. The further determination module 233.2 is in particular set up for calculating the target combined ion concentration according to the following calculation scheme:

When target $H3O^+$ ion concentration <target $OH^-$ ion concentration, target combined ion concentration=target $H3O^+$ ion concentration otherwise target combined ion concentration=(−1)*target $OH^-$ ion concentration.

As is further apparent from the exemplary embodiment of FIG. 2b a (single) combined ion controller 211 is provided and set up accordingly. As inputs the ion controller 211 receives the target combined ion concentration from the determination module 233.1 and the actual combined ion concentration from determination module 233.2. The combined ion controller 211 is set up for deriving a manipulated variable from the control deviation. A valve means may then be controlled with the manipulated variable.

The mode of operation of the ion controller apparatuses 204 and 211 are more particularly described below by means of FIGS. 3a and 3b and the above-described FIGS. 2a and 2b. FIGS. 3a and 3b show exemplary diagrams of exemplary embodiments of methods according to the present invention.

In a first step 301 the actual pH of the mixture in a reactor chamber may be measured. In particular the measured actual pH may be provided to the ion controller apparatus 204. In a subsequent (optional) step 302 the measured actual pH may be corrected. In particular, for example the temperature of the mixture may result in the measured actual pH comprising an error. The correction device 230 can calculate a corrected actual pH. Furthermore, a specifiable target pH may also be corrected correspondingly. It will be appreciated that a correction may be eschewed when the ion controller apparatus 204 is already provided with correct pH values. A target pH may optionally also be corrected in the same step.

Subsequently in step 303 at least one actual ion concentration may be determined at least from the provided correct actual pH (referred to hereinbelow as actual pH). It is preferable when in step 303 an actual $H3O^+$ ion concentration and an actual $OH^-$ ion concentration are determined from the actual pH from an evaluation device 206. In particular a linearization of the control problem is undertaken by converting the actual pH and optionally the target pH according to an ion concentration. The conversion may be performed to afford either an $H3O^+$ concentration or an $OH^-$ or $COH^-$ concentration. It is a particular objective of the conversion that the reaction of the auxiliary controlled variables (pH as $H3O^+$ concentration or pH as $OH^-$ concentration) react to changes in the manipulated variable in the same order of magnitude. This is advantageous in particular for an improved, equivalent switchover between the ion controllers. The correction of the temperature influence and the salt influence may therefore preferably be effected such that the switchover of the ion controllers 210.1, 210.2 is effected (approximately) at the breakthrough point of the titration curve.

In the next step 304 it may then initially be decided which of the two ion controllers 210.1, 210.2 is activated for controlling. The selection of which of the two ion controllers 210.1, 210.2 is active may be determined by the ion controller selection device 232 in particular by reference to the control deviations. The ion controller 210.1, 210.2 having the larger control deviation in terms of magnitude may be activated. Said controller accordingly controls the process. The inactive ion controller 210.1, 210.2 may be set to tracking.

In step 305 the activated ion controller 210.1, 210.2 then controls the at least one valve means according to the actual ion concentration provided by the evaluation device 206 and the target ion concentration provided by the evaluation device 206.

Having regard to FIG. 3b steps 306 and 307 are provided instead of steps 304 and 305. In step 306 in particular the calculation of the actual combined ion concentration and the target combined ion concentration is effected by means of modules 233.1 and 233.2.

In step 307 the activated combined ion controller 211 then controls the at least one valve means according to the determined actual combined ion concentration.

It will be appreciated that the above-described steps may be at least partly performed in parallel. In particular a (virtually) continuous monitoring and controlling of the neutralization process may be effected.

FIG. 4 shows an exemplary simulation example for neutralization of a hydrochloric acid stream HCl of 550 kg/h with a sodium hydroxide solution stream NaOH as the manipulated variable. The upper graph of FIG. 4 shows the pH breakthrough curve. The middle graph shows the ion concentrations ($H3O^+$, $OH^-$). The lower graph shows a combined ion concentration.

If switchover is effected at the breakthrough point of the titration curve the (linear) system response of the auxiliary controlled variables actual $OH^-$ ion concentration and actual $H3O^+$ ion concentration to changes in the manipulated variable is identical with the exception of the prefix as is apparent from the middle graph of FIG. 4. With the exception of the effective direction (inverse, direct) both ion controllers may therefore be parameterized in the same way. As is shown by the lower graph the same system response (behaviour of the ion concentration upon alteration of the manipulated variable) can be achieved over both ion concentration ranges.

The invention claimed is:

1. Neutralization plant, comprising:
   at least one reaction chamber having a first feed for an acid-containing product and at least one further feed for a base-containing product,
   wherein at least one of the feeds comprises at least one valve means for controlling the inflow amount into the reaction chamber, and
     an ion controller apparatus set up for controlling the valve means
   wherein
   the ion controller apparatus comprises at least one evaluation device set up for determining at least one actual ion concentration based on an actual pH of the mixture present in the reaction chamber and
   the ion controller apparatus comprises at least one ion controller device comprising at least one ion controller set up for controlling the valve means according to the actual ion concentration and a target ion concentration.

2. Neutralization plant according to claim 1, wherein
   the evaluation device comprises a first evaluation module set up for determining a first actual ion concentration based on the actual pH and
   the evaluation device comprises at least one further evaluation module set up for determining at least one further actual ion concentration based on the actual pH.

3. Neutralization plant according to claim 2, wherein
   the first actual ion concentration is an actual OH$^-$ ion concentration and/or
   the further actual ion concentration is an actual H3O$^+$ ion concentration.

4. Neutralization plant according to claim 2, wherein
   the ion controller device comprises a first ion controller and at least one further ion controller,
   the first ion controller is set up to control the valve means according to the first actual ion concentration and the first target ion concentration and
   the further ion controller is set up to control the valve means according to the further actual ion concentration and the further target ion concentration.

5. Neutralization plant according to claim 4, wherein
   the first ion controller is an OH$^-$ ion controller and/or
   the further ion controller is an H3O$^+$ ion controller.

6. Neutralization plant according to claim 4, wherein
   the ion controller apparatus comprises at least one ion controller selection device set up for determining an active ion controller from the first ion controller and the further ion controller,
   wherein only the active ion controller controls the valve means.

7. Neutralization plant according to claim 6, wherein the ion controller selection device is set up to determine the active ion controller based on the control deviation between the first actual ion concentration and the first target ion concentration and/or the control deviation between the further actual ion concentration and the further target ion concentration.

8. Neutralization plant according to claim 6, wherein
   the ion controller selection device comprises a first controlled variable deviation module set up for determining the magnitude of the control deviation between the first actual ion concentration and the first target ion concentration,
   the ion controller selection device comprises at least one further controlled variable deviation module set up for determining the magnitude of the control deviation between the further actual ion concentration and the further target ion concentration,
   the ion controller selection device comprises at least one comparison module set up for comparing the determined magnitudes and
   the ion controller selection device is set up for determining the active ion controller based on the comparison result.

9. Neutralization plant according to claim 6, wherein the ion controller selection device is set up for switching the inactive ion controller to tracking such that a substantially smooth switchover between the first ion controller and the further ion controller is achieved.

10. Neutralization plant according to claim 1, wherein the ion controller is a PID controller.

11. Neutralization plant according to claim 1, wherein the ion controller apparatus comprises at least one correction device set up for correcting the actual pH and/or the target pH of the mixture present in the reaction chamber.

12. Neutralization plant according to claim 1, wherein
    a combined ion controller is provided,
    the combined ion controller is set up to control the valve means according to an actual combined ion concentration and a target combined ion concentration,
    wherein a first determination module set up for determining the actual combined ion concentration according to the actual OH$^-$ ion concentration and the actual H3O$^+$ ion concentration is provided and/or
    wherein a further determination module set up for determining the target combined ion concentration according to the target OH$^-$ ion concentration and the target H3O$^+$ ion concentration is provided.

13. Computer-implemented method for neutralizing an acid-containing or base-containing mixture in a neutralization plant, comprising at least one reaction chamber comprising the acid-containing or base-containing mixture and at least one feed comprising at least one valve means for controlled feeding of an inflow amount into the reaction chamber,
    wherein the method comprises:
    a) providing an actual pH of the mixture present in the reaction chamber and at least one target ion concentration,
    b) transferring the actual pH to an evaluation device, wherein the evaluation device derives at least one actual ion concentration from the actual pH,
    c) transferring the actual ion concentration to an ion controller which determines a control deviation from the actual ion concentration from b) to the target ion concentration,
    d) controlling the feeding of the inflow amount into the reaction chamber by operation of the valve means according to the control deviation from c).

14. Method according to claim 13, wherein in a step a') the actual pH and optionally the target pH from a) is transferred into a correction device which corrects the actual pH and optionally the target pH via one or more influences on the dissociation of water selected from a group comprising acid and base combination, temperature and salt formation and in subsequent step b) the corrected actual pH and target pH are transferred to the evaluation device.

15. Ion controller apparatus for a neutralization plant, comprising:
    at least one evaluation device set up for determining at least one actual ion concentration from an actual pH of a mixture present in a reaction chamber of the neutralization plant and at least one ion controller device having at least one ion controller set up for controlling at least one valve means of a feed into the reaction chamber of the neutralization plant according to the actual ion concentration and a target ion concentration.

\* \* \* \* \*